US008233094B2

(12) United States Patent
Subbotin et al.

(10) Patent No.: US 8,233,094 B2
(45) Date of Patent: Jul. 31, 2012

(54) METHODS, SYSTEMS AND APPARATUSES FOR MOTION DETECTION USING AUTO-FOCUS STATISTICS

(75) Inventors: Igor Subbotin, South Pasadena, CA (US); Alexander Mokhnatyuk, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 1468 days.

(21) Appl. No.: 11/802,728

(22) Filed: May 24, 2007

(65) Prior Publication Data
US 2008/0291333 A1    Nov. 27, 2008

(51) Int. Cl.
*H04N 5/14* (2006.01)
(52) U.S. Cl. .......................................... 348/700
(58) Field of Classification Search ........... 348/700–701
See application file for complete search history.

(56) References Cited

U.S. PATENT DOCUMENTS

| 4,081,830 | A | 3/1978 | Mick et al. |
| 6,654,498 | B2* | 11/2003 | Takahashi et al. ............. 382/232 |
| 7,142,600 | B1 | 11/2006 | Schonfeld et al. |
| 7,190,263 | B2* | 3/2007 | McKay et al. ............. 340/539.1 |
| 7,760,953 | B2* | 7/2010 | Takei ............................ 382/236 |
| 7,983,458 | B2* | 7/2011 | Wang et al. .................... 382/128 |
| 2002/0135681 | A1* | 9/2002 | Lo ............................... 348/208.7 |
| 2003/0123551 | A1* | 7/2003 | Kim ........................... 375/240.16 |
| 2003/0151672 | A1 | 8/2003 | Robins et al. |
| 2004/0047419 | A1 | 3/2004 | Wakabayashi et al. |
| 2004/0212677 | A1 | 10/2004 | Uebbing |
| 2004/0218787 | A1* | 11/2004 | Tagami et al. ............... 382/107 |
| 2005/0134745 | A1 | 6/2005 | Bacche et al. |
| 2005/0168651 | A1 | 8/2005 | Morino |
| 2006/0061654 | A1 | 3/2006 | McKay et al. |
| 2006/0170772 | A1 | 8/2006 | McEwan |
| 2006/0197866 | A1 | 9/2006 | Fujimoto |
| 2006/0215030 | A1 | 9/2006 | Shih et al. |
| 2006/0215922 | A1 | 9/2006 | Koch et al. |

(Continued)

FOREIGN PATENT DOCUMENTS

GB    2 343 318 A    5/2000
GB    2 427 025 A    12/2006

(Continued)

OTHER PUBLICATIONS

"Temporal video segmentation: A survey" in Elsevier Signal Processing: Image Communication 16 (2001) 477-500 to Koprinska et al.*
Andrea Cavallaro, et al., "Accurate Video Object Segmentation Through Change Detection", 2002 IEEE, pp. 445-448.
Don Murray, et al., "Motion Tracking with an Active Camera", IEEE Transactions on Pattern Analysis and Machine Intelligence, vol. 16, No. 5, May 1994, pp. 449-459.

(Continued)

*Primary Examiner* — Mehrdad Dastouri
*Assistant Examiner* — Mohammed Rahaman
(74) *Attorney, Agent, or Firm* — Nancy Y. Ru; Louis R. Levenson

(57) ABSTRACT

Methods, systems and apparatuses for the detection of motion using statistics data already available within an imager, such as sharpness scores or brightness values. The method includes obtaining at least two sets of statistics data for respective image frames which include corresponding windows; initializing a motion counter; determining, for each window, a relative difference value for the particular window; comparing the relative difference value to a first threshold. If the relative difference value is greater than the first threshold, the method increments the motion counter; and determines if there is motion by comparing the value of the motion counter to a second threshold. The motion detection may further take into account the relative importance of certain areas of the image frame.

14 Claims, 4 Drawing Sheets

U.S. PATENT DOCUMENTS

| | | | |
|---|---|---|---|
| 2007/0009248 A1 | 1/2007 | Subbotin | |
| 2007/0035630 A1 | 2/2007 | Lindenstruth et al. | |
| 2007/0058837 A1 | 3/2007 | Boregowda et al. | |
| 2008/0143840 A1* | 6/2008 | Corkum et al. | 348/208.6 |

FOREIGN PATENT DOCUMENTS

| | | |
|---|---|---|
| JP | 2005-236724 | 9/2005 |
| KR | 20040087932 | 10/2004 |
| TW | 242380 B | 10/2005 |
| TW | 248760 B | 2/2006 |
| WO | WO 2004/054223 A1 | 6/2004 |
| WO | WO 2004054223 A1 * | 6/2004 |

OTHER PUBLICATIONS

Rasmus Larsen, "Estimation of Visual Motion in Image Sequences", The Institute of Mathematical Modelling, Ph.D. Thesis No. 1, Lyngby 1995.

Lisa M. Brown, et al., "Visualizing Motion in Video", I.B.M., T.J. Watson Research Center, Hawthorne, NY 10532, available at—http://www.research.ibm.com/ecvg/pubs/lisa.motion.ps.

Jiang, Li-Fen et al., Motional Detection and Orientation Judgement in Secure Surveillance System, Journal of Tianjin Normal University (Natural Science Edition), Jun. 30, 2004, pp. 55-57, vol. 24.

* cited by examiner

METHODS, SYSTEMS AND APPARATUSES FOR MOTION DETECTION USING AUTO-FOCUS STATISTICS

FIELD OF THE INVENTION

Disclosed embodiments relate generally to an image capturing device and, more particularly, to a motion detection technique for an image capturing device.

BACKGROUND OF THE INVENTION

There are several algorithms related to image processing which rely on motion detection. For example, the method described in co-pending application Ser. No. 11/509,712, filed Aug. 25, 2006, entitled METHOD, APPARATUS AND SYSTEM PROVIDING ADJUSTMENT OF PIXEL DEFECT MAP, uses motion detection to separate real defects from small elements of the scene in determining the location of defects in the pixel array. As another example, passive continuous auto-focus algorithms use motion detection to control their refocusing procedures.

Simple algorithms for motion detection compare an image of the current frame with a reference frame image and count the number of pixels which are different between the frames. This type of motion detection algorithm, however, requires a large frame memory buffer and, therefore, cannot easily be implemented in system-on-a-chip (SOC) imager systems which have circuit area limitations. Moreover, the large frame memory adds cost to the imaging device.

Accordingly, there exists a need for an improved method and system for motion detection within an imager. There further exists a need for a motion detection system and method which may be implemented in an SOC system.

DETAILED DESCRIPTION OF THE INVENTION

Figure 1:
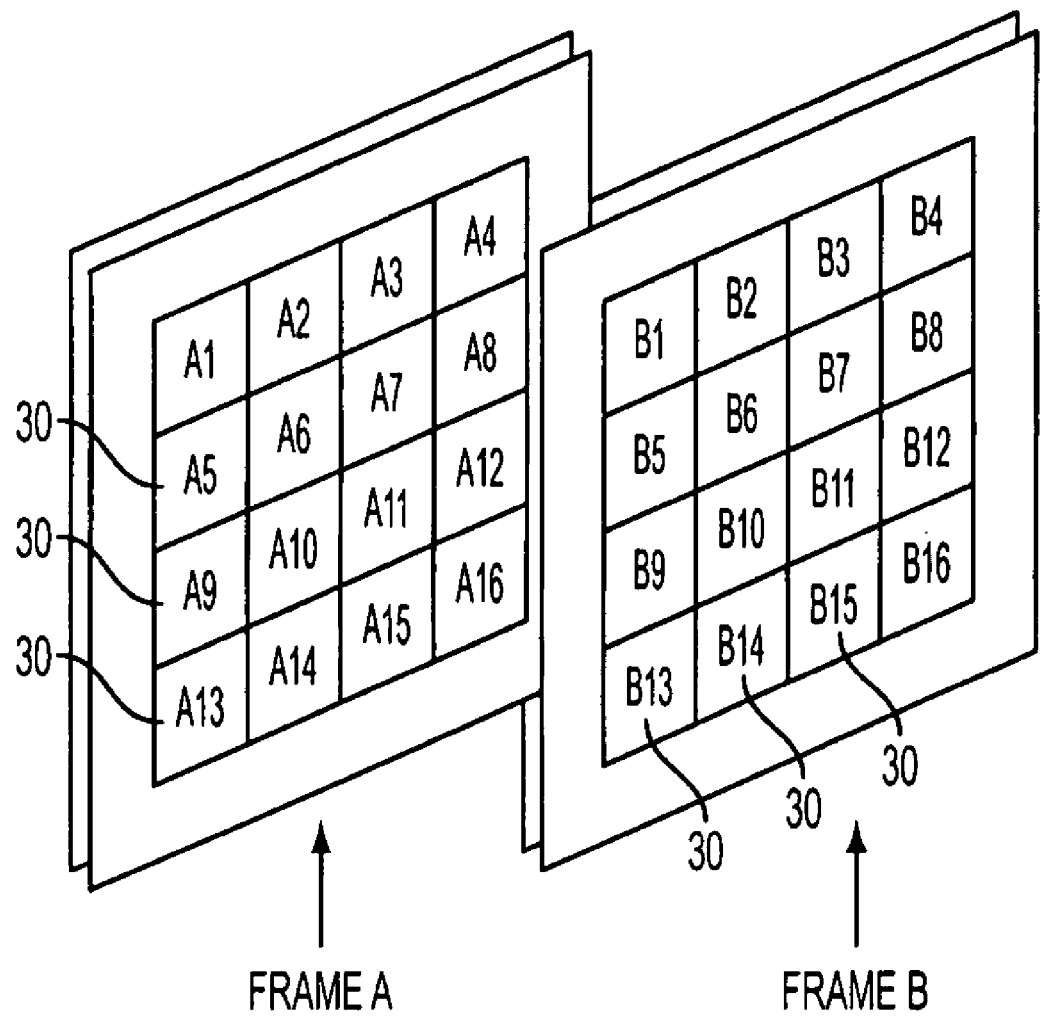
FIG. 1 illustrates image frames between which motion may be detected in accordance with disclosed embodiments.

In the following detailed description, reference is made to the accompanying drawings which form a part hereof, and in which are shown, by way of illustration, specific embodiments. These embodiments are described in sufficient detail to enable those skilled in the art to make and use them, and it is to be understood that structural, logical or procedural changes may be made. Particularly, in the description below, processes are described by way of flowchart. In some instances, steps which follow other steps may be reversed, be in a different sequence or be in parallel, except where a following procedural step requires the presence of a prior procedural step. The disclosed processes may be implemented by an image processing pipeline or other circuit which processes an array of pixel values. The image processing can be implemented using hardware circuits, programmed processors, or a combination of the two.

Disclosed embodiments provide a motion detection method, system and apparatus for detecting motion based on statistics data that already exists within an imager for other purposes. Disclosed embodiments base the determination of whether or not there is motion in the scene on the relative values of the statistics data between two frames of the imaged scene. This allows the disclosed embodiments to be easily implemented with minimal expense.

One type of statistics data that is readily available within most imagers is a sharpness score. The sharpness score is a number representing the degree of contrast between adjacent areas within a zone. In a digital camera, sharpness scores are determined by measuring the difference between the intensities of adjacent areas of a pixel array. The pixel array is divided into multiple zones, and a sharpness score for each zone is calculated after an analysis of adjacent areas within each zone. In a red/green/blue (RGB) pixel array, the intensity of each pixel may be calculated by converting the RGB values into a hue/saturation/value (HSV) system, where the value V variable is used to represent intensity. In this way, intensity values for each pixel may be calculated, and differences in intensities of multiple pixels may be calculated. These differences in intensities represent sharpness scores. Most cameras, including digital cameras, have an automatic focus feature in which scenes viewed through the camera can be focused automatically. When an image is out of focus, the sharpness score for the image decreases; the sharpness score is used to implement the auto-focus functionality (by changing the distance between lens and sensor based on the sharpness score).

Another type of statistics data that is readily available within most imagers is luma. Luma represents the brightness in an image and may also be referred to as a brightness value. Each pixel of a pixel array has an associated brightness value, which is expressed as a combination of multi-bit digital data values (e.g., one each for red, green and blue). If eight bits are used to describe each of red, green and blue, then the value of each may range from 0 to 255. Therefore, the brightness value may also range from 0 to 255 for such an RGB, 8-bit imager.

FIG. 1 illustrates two image frames (Frame A and Frame B), each comprising a plurality of windows 30 arranged in a 4×4 grid. A conventional auto-focus statistics engine (e.g., statistics engine 122, FIG. 3) operates with a set of windows 30 arranged in an N×M grid and provides a sharpness score and an average brightness (luma) for each window 30. Each window 30 comprises a plurality of pixels. Disclosed embodiments implement motion detection using these data (sharpness score and brightness) by calculating, for each window, changes in the statistics data received for two different frames. The plurality of windows 30 of Frame A corresponds with the plurality of windows 30 of Frame B, such that window $A_1$ corresponds with window $B_1$, window $A_2$ corresponds with window $B_2$, etc.

In conventional auto-focus operations, the sharpness score and brightness are calculated for each window 30. These values are the statistics data for the window 30 and are used in the disclosed embodiments for motion detection. Two thresholds are stored in memory for use in motion detection: (1) a threshold TH_ratio for an acceptable amount of change between frames A, B for a single window (e.g., between $A_1$ and $B_1$) and (2) a threshold TH_motion_cnt for an acceptable amount of windows 30 with change above the threshold TH_ratio. The statistics data for two frames A, B of each window 30 are obtained and the change between frames A, B is determined for each window 30. Then, a determination of how many windows 30 have statistics values that have changed more than the TH_ratio threshold is made. If the determined number of windows having statistics that have changed more than the TH_ratio threshold is larger than the TH_motion_cnt threshold, then motion is detected.

Figure 2:
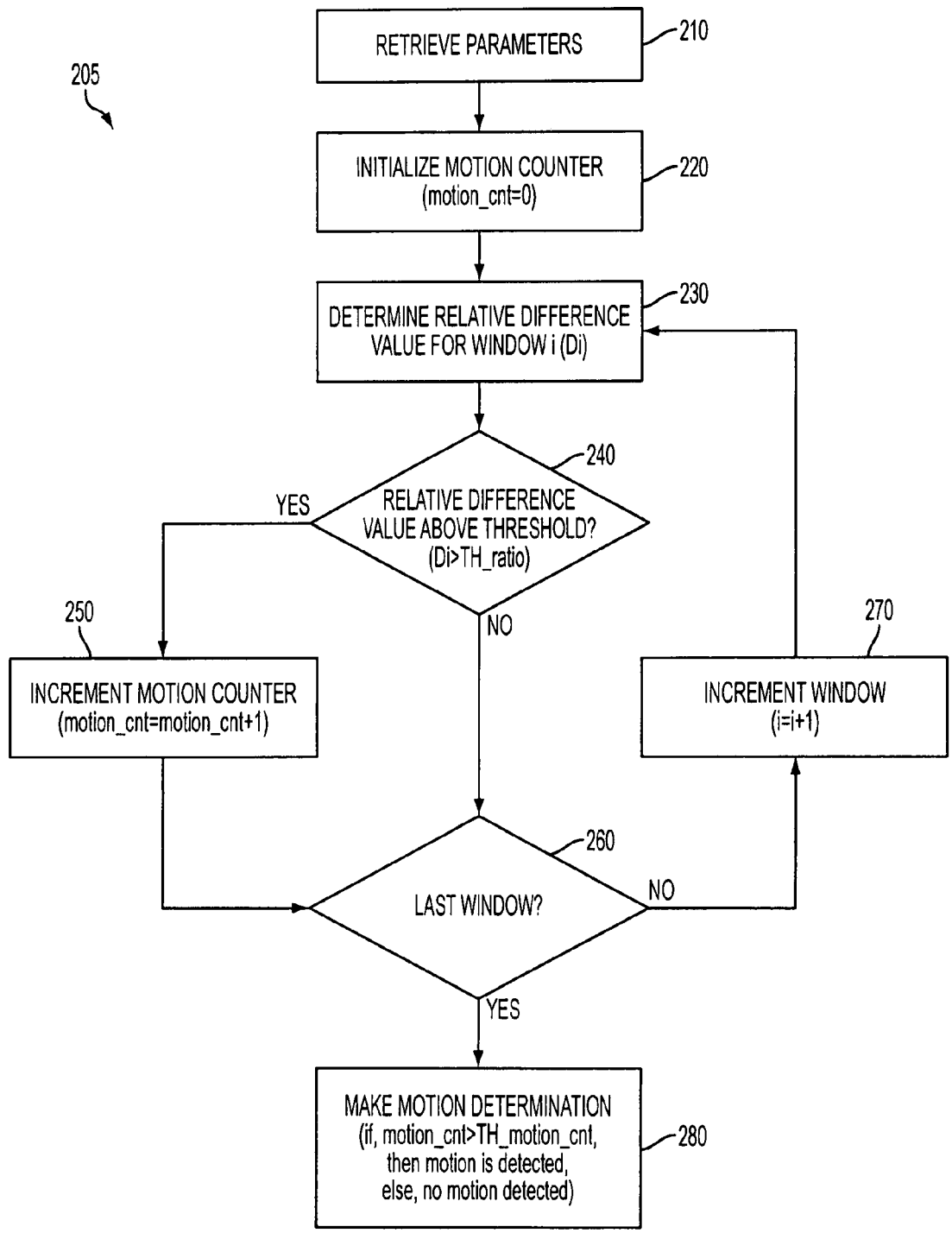
FIG. 2 is a flowchart illustrating the steps of a method for using statistics data for motion detection in accordance with disclosed embodiments.

One disclosed embodiment is now described in more detail with reference to FIGS. 1 and 2. FIG. 2 is a flowchart illustrating the steps of a method 205 of using statistics data for motion detection in accordance with disclosed embodiments.

Figure 3:
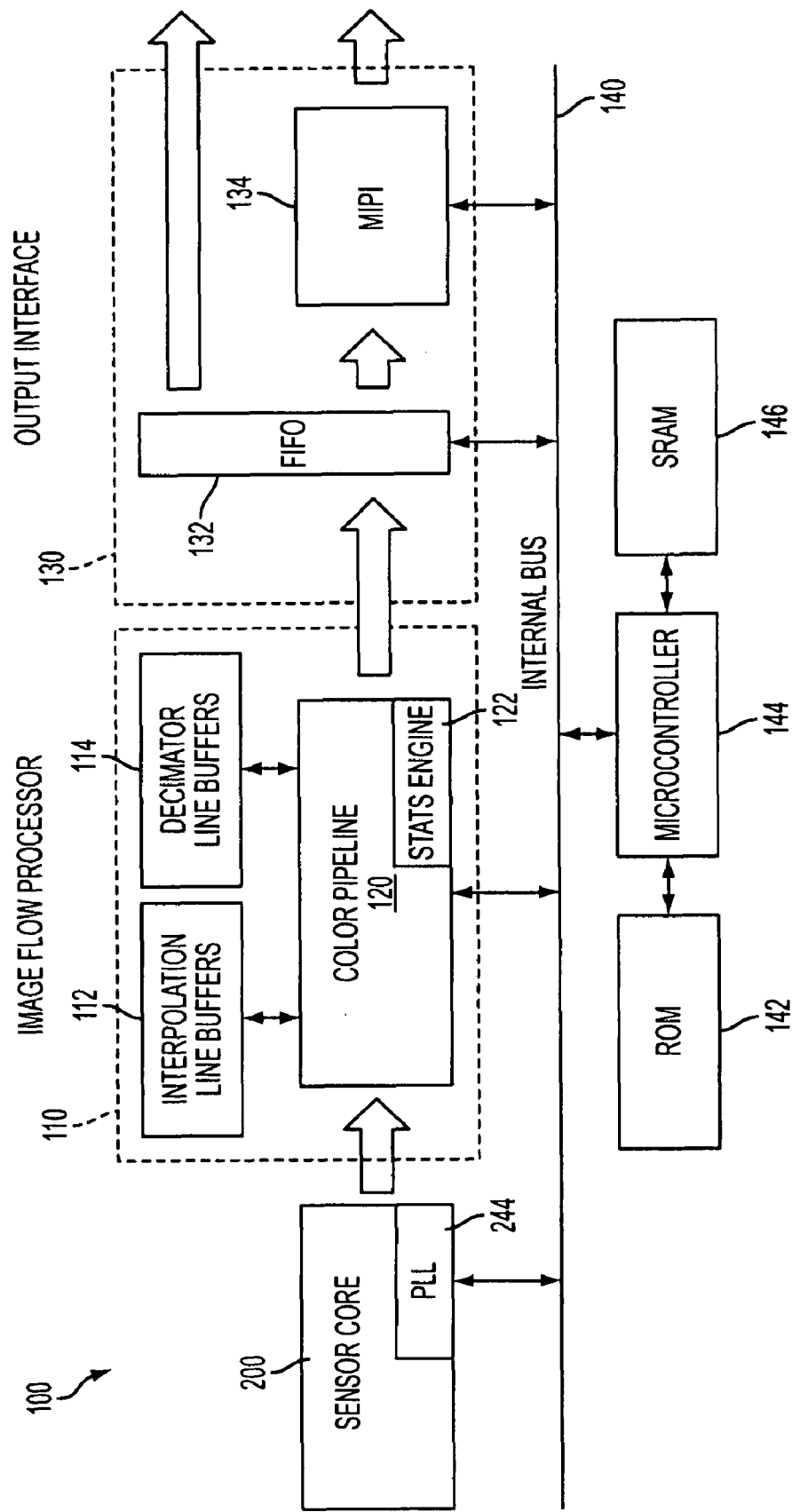
FIG. 3 is a block diagram of a system-on-a-chip (SOC) imager construction implementing disclosed embodiments.

At step 210, the array of statistics data from Frame A, the array of statistics data from Frame B, the windows data change threshold TH_ratio and the maximum number of changed windows threshold TH_motion_cnt are obtained. In this embodiment, the statistics data includes sharpness scores and/or brightness for each window 30 of each frame A, B. These input parameters are previously stored within or determined by the image flow processor 110 (FIG. 3). At step 220, motion counter motion_cnt is initialized; e.g., it is set to zero. At step 230, the relative difference value for the first window, $D_1$, is calculated as shown in Equation (1):

$$D_i = |A^i - B^i| / max(A_i, B_i)* \quad (1)$$

where $D_i$ is the difference value for window i, $A_i$ is the value of the statistics data for window i of frame A, $B_i$ is the value of the statistics data for window i of frame B, and $max(A_i, B_i)$ is the higher of the statistics data values for window i of frames A and B.

It should be noted that disclosed embodiments may operate using only the change in sharpness score or only the change in average brightness (luma) or the results from these two statistics values could be combined in making a decision about motion. If the combination of the two statistics values is being used to make a decision about motion, then $D_i$ is determined as the sum of the absolute values for each of sharpness score and average brightness divided by the sum of the max value of each of sharpness score and average brightness.

At step 240, if $D_1$ is greater than the windows data change threshold TH_ratio, the counter motion_cnt is incremented at step 250, as shown in Equation (2):

$$\text{If } D_i > TH\_\text{ratio, then motion\_cnt=motion\_cnt+1,} \quad (2)$$

otherwise, the counter motion_cnt does not change.

At step 260 a determination is made as to whether window i is the last window 30 of the frame. If window i is not the last window (e.g., i is not equal to Nwin), then i is incremented at step 270 and the next difference value ($D_i$) is calculated at step 230, again using Equation (1). The counter motion_cnt is incremented if necessary at step 250, using Equation (2), and i is again incremented until $D_i$ has been calculated for all windows in the frame. Once a difference value has been calculated for each window 30, a determination of whether or not there was motion is made at step 280. This determination is made in accordance with Equation (3):

$$\text{If motion\_cnt>TH\_motion\_cnt, then M=1, else M=0;} \quad (3)$$

where M=1 (true) corresponds to detected motion and M=0 (false) corresponds to no detected motion.

Disclosed embodiments use statistics data that is already collected within the imager for use in other image processing functions, such as, e.g. focus. The method of the disclosed embodiments provides an additional benefit in that the costs for adding a motion detection feature are low since the method uses information for motion detection that is already available within the image flow processor 110.

In an additional disclosed embodiment, the motion detection may be weighted such that changes in a certain portion of the frame are more important than changes in a different portion of the frame, by using different weights for different windows. For example, if it is desired to make the motion detection in a central part of an image more sensitive than in the peripheral portions, windows at the center of the frame will be given a higher weight than windows at the periphery. A weighted motion score can be calculated in accordance with Equation (4):

$$\text{Motion\_score} = \sum_{i=1}^{i=Nwin} Weight_i * Motion_i; \quad (4)$$

where Motion_score represents the total amount of motion in the image (and is similar to motion_cnt), $Motion_i$ is a variable representing the amount of motion sensed in a particular window i of the imager array, $Weight_i$ is the weight given to window i, and $N_{win}$ is the total number of windows. $Motion_i$ is set to be equal to one if the change in the statistics data is more than threshold TH_ratio for window i and is equal to zero if it is not.

Once the Motion_score is calculated, it is compared with predefined threshold TH_motion_cnt. If Motion_score is greater than TH_motion_cnt, motion is detected. If Motion_score is less than TH_motion_cnt, motion is not detected.

FIG. 3 illustrates a block diagram of a system-on-a-chip (SOC) imager constructed in accordance with disclosed embodiments. The system-on-a-chip may use any type of imager technology, CCD, CMOS, etc. The system-on-a-chip also includes the motion detection capabilities of the disclosed embodiments.

The imager 100 comprises a sensor core 200 that communicates with an image flow processor 110 that is connected to an output interface 130. Sensor core 200 may include a pixel array. A phase-locked loop (PLL) 244 is used as a clock for the sensor core 200. The image flow processor 110, which is responsible for image and color processing, includes interpolation line buffers 112, decimator line buffers 114, and a color processing pipeline 120. The color processing pipeline 120 includes, among other things, a statistics engine 122. One of the functions of the image flow processor 110 is the performance of motion detection in accordance with disclosed embodiments. The sharpness scores and brightness values for the individual windows (FIG. 1) are determined by the statistics engine 122.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image flow processor 110, and output interface 130.

Disclosed embodiments may be implemented as part of an image flow processor 110, by a processor executing a program, by hardware circuits with a processing pipeline, or by a combination of both, etc. The method 205 may be implemented as computer instructions and stored on a computer readable storage medium.

Figure 4:
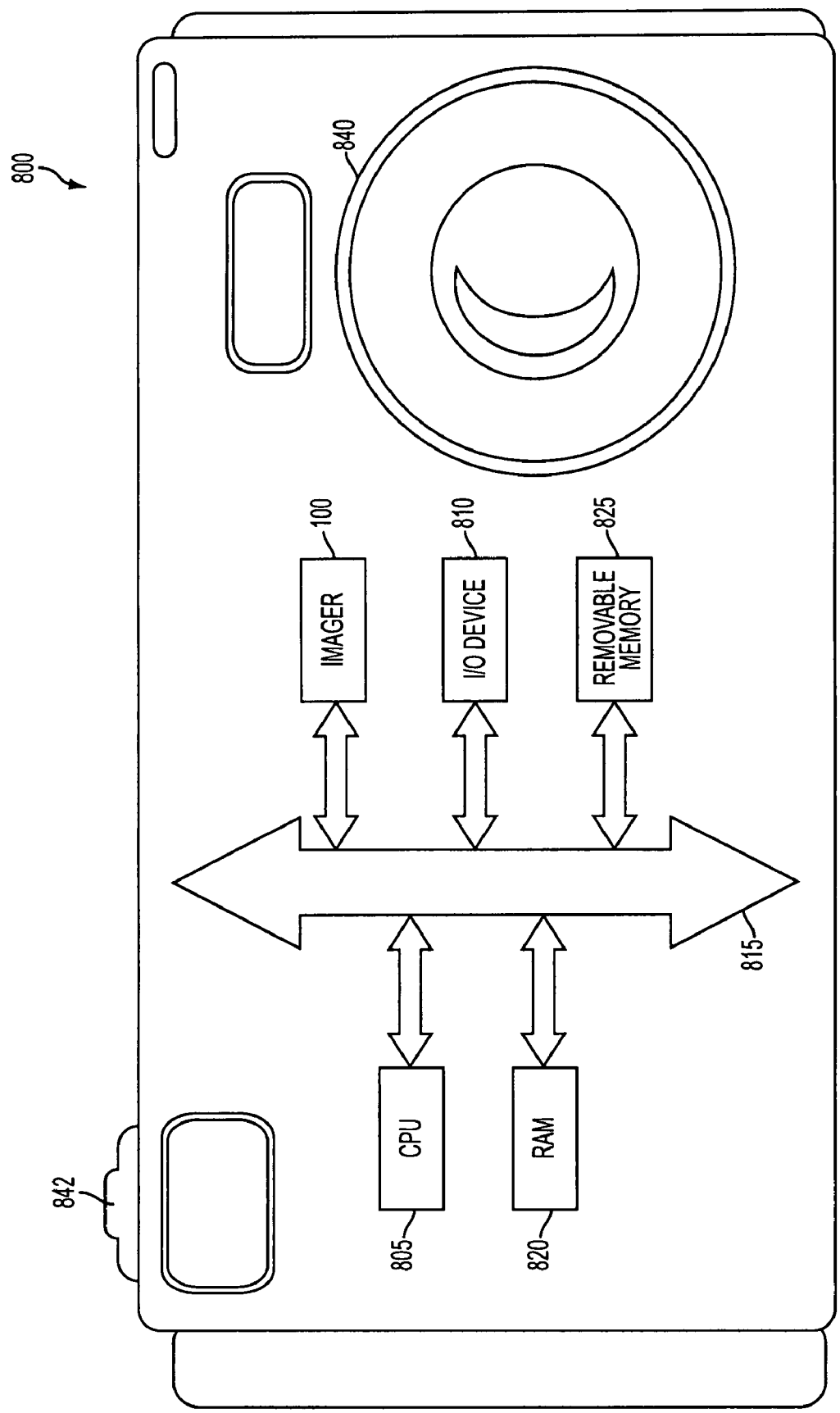
FIG. 4 depicts a camera system, for example, a digital still or video camera, which may employ an imager constructed in accordance with disclosed embodiments.

Disclosed embodiments may be implemented as part of a camera such as e.g., a digital still or video camera, or other image acquisition system. FIG. 4 illustrates a processor system as part of, for example, a digital still or video camera system 800 employing a system-on-a-chip imager 100 as illustrated in FIG. 3, which imager 100 provides for motion detection as described above. The processing system includes a processor 805 (shown as a CPU) which implements system, e.g. camera 800, functions and also controls image flow through the system. The processor 805 is coupled with other elements of the system, including random access memory 820, removable memory 825 such as a flash or disc memory, one or more input/out devices 810 for entering data or displaying data and/or images and imager 100 through bus 815 which may be one or more busses or bridges linking the processor system components. The imager 100 receives light corresponding to a captured image through lens 840 when a shutter release button 842 is depressed.

While described embodiments have been described in detail, it should be readily understood that the embodiments are not limited to those disclosed. Rather the embodiments can be modified to incorporate any number of variations, alterations, substitutions or equivalent arrangements not heretofore described.

What is claimed as new and desired to be protected by Letters Patent of the United States is:

1. A method for detecting motion using a system-on-a-chip imager comprising:
    obtaining motion sensitive statistics data for at least first and second image frames, wherein each image frame comprises a plurality of corresponding windows and wherein the motion sensitive statistics data includes a sharpness score for each of the corresponding windows in each image frame;
    for each window, determining a relative difference value using the sharpness scores from the first and second image frames;
    determining a number of times the relative difference value is greater than a first threshold; and
    determining if there is motion by comparing the number of times the relative difference value is greater than the first threshold to a second threshold, wherein the first threshold represents an amount of change in sharpness scores for a single window between image frames, wherein the second threshold represents a number of windows for which the relative difference value is greater than the first threshold, wherein the relative difference value for each window is computed as an absolute value of a difference between sharpness scores associated with that window from the first and second image frames divided by a maximum of sharpness scores associated with that window from the first and second image frames, and wherein the sharpness score for each of the corresponding windows comprises a number representing a difference between intensity values of adjacent areas in that corresponding window.

2. The method of claim 1, wherein the motion sensitive statistics data further comprises brightness values for each of the corresponding windows in each image frame.

3. A method for detecting motion using a system-on-a-chip imager comprising:
    obtaining motion sensitive statistics data for at least first and second image frames, wherein each image frame comprises a plurality of corresponding windows and wherein the motion sensitive statistics data includes a sharpness score for each of the corresponding windows in each image frame;
    for each window, determining a relative difference value for a particular window using the sharpness scores from the first and second image frames;
    determining a motion score, wherein the motion score is a summation, for each window for which the relative difference value is greater than a first threshold, of a motion variable multiplied by a weight factor corresponding to each window; and
    determining if there is motion by comparing the value of the motion score to a second threshold, wherein the first threshold represents an amount of change in sharpness scores for a single window between image frames, wherein the second threshold represents a maximum value of the motion score, wherein the relative difference value for each window is computed as an absolute value of a difference between sharpness scores associated with that window from the first and second image frames divided by a maximum of sharpness scores associated with that window from the first and second image frames, and wherein the sharpness score for each of the corresponding windows comprises a number representing a difference between intensity values of adjacent areas in that corresponding window.

4. The method of claim 3, wherein the weight factors are based on the relative importance of the particular window to which it corresponds.

5. The method of claim 3, wherein the weight factor for a window near the center of the image frame is higher than the weight factor for a window near a periphery of the image frame.

6. The method of claim 3, wherein the motion sensitive statistics data further comprises brightness values for the each of the corresponding windows in each image frame.

7. An imaging device comprising:
    a pixel array, the pixel array outputting a plurality of pixel values; and
    an image processing unit coupled to the pixel array, the imaging processing unit being operable to detect motion in a scene represented by the plurality of pixel values, wherein motion is detected using changes in a sharpness score and a brightness value in different image frames, wherein each image frame comprises a plurality of windows, and wherein the sharpness score and the brightness value are determined for each window of each image frame, wherein the image processing unit is further operable to:
    for each window, determine a relative difference value for a particular window using the sharpness score and the brightness value from first and second image frames;
    determine a number of times the relative difference value is greater than a first threshold; and
    determine if there is motion by comparing the number of times the relative difference value is greater than the first threshold to a second threshold, wherein the first threshold represents an amount of change in sharpness scores for a single window between image frames, wherein the second threshold represents a number of windows for which the relative difference value is greater than the first threshold, wherein the relative difference value for each window is computed as an absolute value of a difference between sharpness scores associated with that window from the first and second image frames divided by a maximum of sharpness scores associated with that window from the first and second image frames, and wherein the sharpness score for each of the corresponding windows comprises a number representing a difference between the pixel values of adjacent pixels in the pixel array associated with that corresponding window.

8. The imaging device of claim 7, wherein the image processing unit further comprises a statistics engine and wherein the sharpness score and the brightness value are computed by the statistics engine.

9. The imaging device of claim 7, wherein motion is detected using a combination of the sharpness score and the brightness value.

10. An imaging system comprising:
a lens;
a pixel array for capturing image frames received through the lens; and
an image processing circuit which is operable to detect motion in the captured image frames, wherein the motion detection comprises:
obtaining motion sensitive statistics data for at least first and second image frames, wherein each image frame comprises a plurality of corresponding windows and wherein the motion sensitive statistics data includes a sharpness score for each of the corresponding windows in each image frame;
for each window, determining a relative difference value for a particular window using the sharpness scores from the first and second image frames;
determining a number of times the relative difference value is greater than a first threshold; and
determining if there is motion by comparing the number of times the relative difference value is greater than the first threshold to a second threshold, wherein the first threshold represents an amount of change in sharpness scores for a single window between image frames, wherein the second threshold represents a number of windows for which the relative difference value is greater than the first threshold, wherein the relative difference value for each window is computed as an absolute value of a difference between sharpness scores associated with that window from the first and second image frames divided by a maximum of sharpness scores associated with that window from the first and second image frames, and wherein the sharpness score for each of the corresponding windows comprises a number representing a difference between intensity values of adjacent areas in that corresponding window.

11. The imaging system of claim 10, wherein an additional portion of the motion sensitive statistics data comprises information from a statistics engine located in the image processing unit.

12. An imaging system comprising:
a lens;
a pixel array for capturing image frames received through the lens; and
an image processing circuit which is operable to detect motion in the captured image frames, wherein the motion detection comprises:
obtaining motion sensitive statistics data for at least first and second image frames, wherein each image frame comprises a plurality of corresponding windows and wherein the motion sensitive statistics data includes a sharpness score for each of the corresponding windows in each image frame;
for each window, determining a relative difference value for a particular window using the sharpness scores from the first and second image frames;
determining a motion score, wherein the motion score is a summation, for each window for which the relative difference value is greater than a first threshold, of a motion variable multiplied by a weight factor corresponding to each window; and
determining if there is motion by comparing the value of the motion score to a second threshold, wherein the first threshold represents an amount of change in sharpness scores for a single window between image frames, wherein the second threshold represents a maximum value of the motion score, wherein the relative difference value for each window is computed as an absolute value of a difference between sharpness scores associated with that window from the first and second image frames divided by a maximum of sharpness scores associated with that window from the first and second image frames, and wherein the sharpness score for each of the corresponding windows comprises a number representing a difference between intensity values of adjacent areas in that corresponding window.

13. The imaging system of claim 12, wherein the weight factor for a window near the center of the image frame is higher than the weight factor for a window near a periphery of the image frame.

14. The imaging system of claim 12, wherein an additional portion of the motion sensitive statistics data comprises information from a statistics engine located in the image processing unit.

* * * * *